J. P. ADAMS.
SAFETY CHECK.
APPLICATION FILED DEC. 21, 1912.
1,079,282.
Patented Nov. 18, 1913.
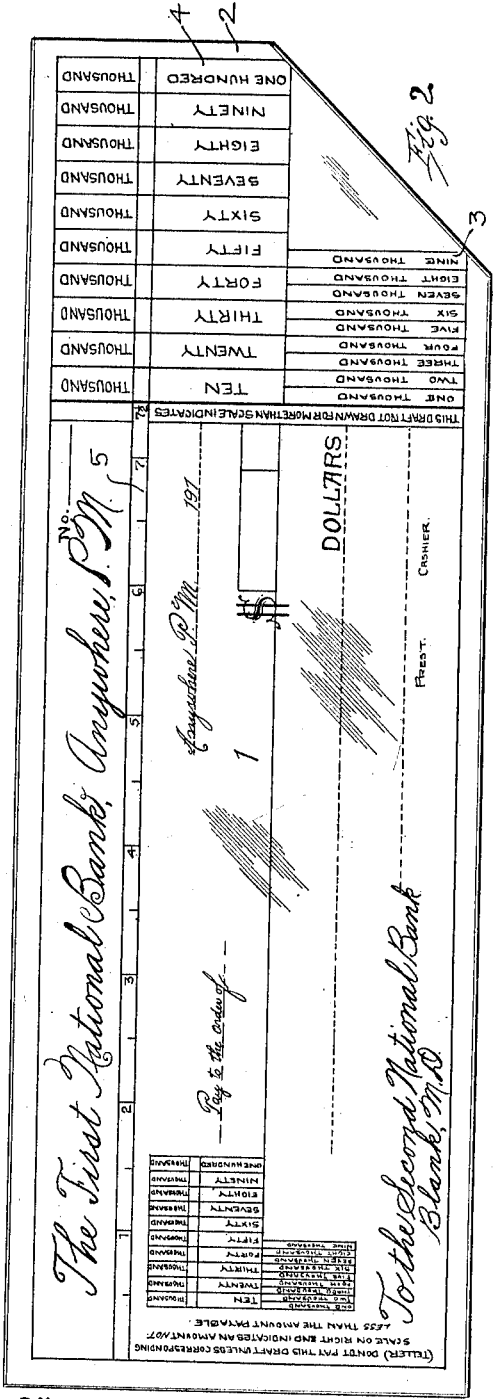
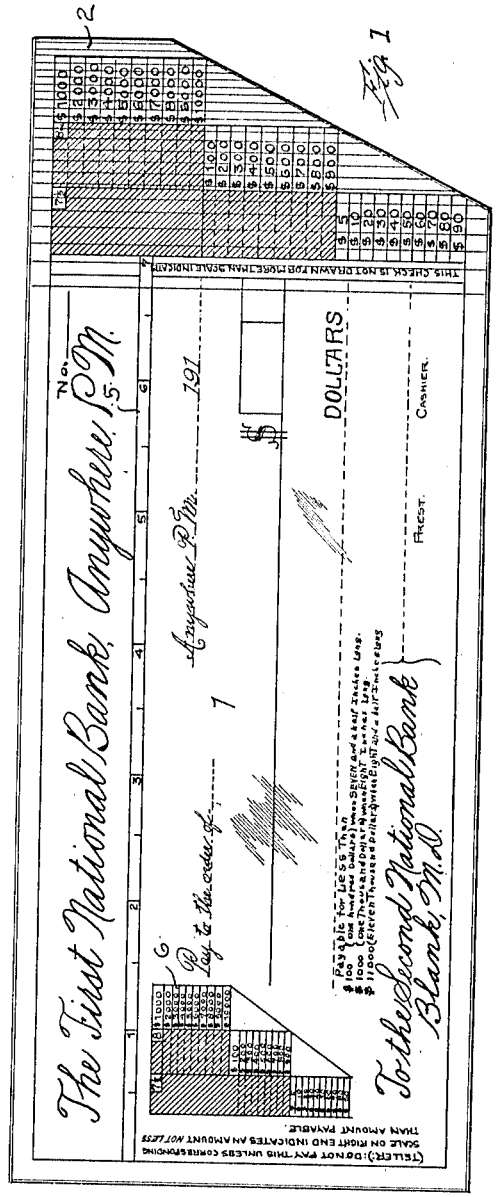
Inventor
J. P. ADAMS.
Witnesses
Robert M. Sutphen
A. I. Hill
By Watson E. Coleman
Attorney

UNITED STATES PATENT OFFICE.

JAMES PIERCE ADAMS, OF SIOUX FALLS, SOUTH DAKOTA.

SAFETY-CHECK.

1,079,282.  Specification of Letters Patent.  Patented Nov. 18, 1913.

Application filed December 21, 1912. Serial No. 738,102.

*To all whom it may concern:*

Be it known that I, JAMES P. ADAMS, a citizen of the United States, residing at Sioux Falls, in the county of Minnehaha and State of South Dakota, have invented certain new and useful Improvements in Safety-Checks, of which the following is a specification, reference being had to the accompanying drawings.

This invention relates to new and useful improvements in checks or other financial instruments and more particularly to that class of bank checks known as safety-checks, the main object of the invention being to provide a simple form of check or the like in which a portion of the same may be torn off in order to indicate by the part that remains an amount not less than that for which the check may be drawn.

Another object of the invention is to provide a safety-check which will possess advantages in points of efficiency and durability, is inexpensive of manufacture and at the same time is simple in construction and operation.

With the above and other objects in view, the invention consists in the novel features of construction and the combination and arrangement of parts to be hereinafter more fully described, pointed out in the claims and shown in the accompanying drawings, in which—

Figure 1 is a face view of a blank check constructed in accordance with my invention, and Fig. 2 is a face view of a slightly different form, designed to be used for checks or drafts of larger denominations than Fig. 1.

Referring more particularly to the drawings, 1 indicates the blank of the check which may be of any well known form which is provided with the protective scale portion 2 at one end, the miniature or reduced scale 6 at the other end, the inch scale 5, the printed reference to the denominations of the various lengths, and the printed instructions to the teller. In this form the scale 5 indicates that the main body of the check is 7 inches in length and the protective scale 2 is divided into three columns of value indicating characters, each column being ¼ inch in width making the entire check, together with the scale 8½ inches in length. This form of check cannot be made payable for more than ten thousand nine hundred ninety dollars. If the check is drawn for an amount of $900.00 or less, the entire column indicating thousands would be removed, leaving the check only 8 inches in length. Therefore, if an attempt were made to raise the figures upon the protective scale so as to make them read thousands, the inch scale 5 would prevent the fraud because a check of $1000.00 or more must be 8½ inches in length. And again, if an attempt were made to alter the figures and words upon the face of the check which specify the relative lengths or the figures representing the amounts which the different lengths specify, the miniature scale 6 upon the left hand end of the check would promptly show the alterations. The miniature scale also calls attention to the fact that there must be a corresponding scale upon the right end indicating an amount not less than the amount payable.

In the present form of check shown in Fig. 1, the body portion is 7 inches in length and the miniature scale 6 will indicate that should the entire protective scale 2 be removed from the body of the check, leaving only the body portion, the check itself would be worthless. For further example, should the check be written for ten dollars, the protective scale 2 would be torn off beneath the ten dollars, removing the entire scale up to ten dollars, leaving the check 7½ inches in length. Now suppose an attempt should be made to raise the check, this could not be done with the scale plainly indicating ten dollars. If the check should be raised the entire protective scale 2 would have to be removed, thus leaving the check only 7 inches in length, rendering the check worthless. Again, if the check were written for an amount of several hundred but less than a thousand, the figures indicating thousands would be removed on the 8 inch line. If an attempt were made to make the figures on the protective scale on the right end read thousands, the inch scale 5 would prevent the fraud because a check of over one thousand must be 8½ inches in length.

My improved check is doubly protected by means of the inch scale 5 and the miniature scale 6, the length of the scale indicating the various values of the check while the miniature scale duplicates the protective scale 2 to plainly indicate whether or not an attempt has been made to alter the figures upon the protective scale. From this it will be seen that I have provided a simple and durable check which provides effective